United States Patent [19]

Di Donato et al.

[11] 4,314,328

[45] Feb. 2, 1982

[54] INFORMATION EXTRACTOR FOR THE SELECTIVE VISUALIZATION OF DATA STORED IN A MONITORING MEMORY

[75] Inventors: Massimino Di Donato, Meda-Milano; Attilio Filisetti, Cornaredo-Milano, both of Italy

[73] Assignee: Società Italiana Telecomunicazioni Siemens S.p.A., Milan, Italy

[21] Appl. No.: 70,035

[22] Filed: Aug. 27, 1979

[30] Foreign Application Priority Data

Aug. 29, 1978 [IT] Italy .................. 27086 A/78

[51] Int. Cl.³ .................. G06F 3/14; G06F 3/04; G06F 13/00; G06F 7/02
[52] U.S. Cl. .................. 364/900
[58] Field of Search ... 364/200 MS File, 900 MS File

[56] References Cited

U.S. PATENT DOCUMENTS

| | | | |
|---|---|---|---|
| 3,581,289 | 5/1971 | Wilhelm et al. | 364/200 |
| 3,585,603 | 6/1971 | Ross et al. | 364/200 |
| 3,588,837 | 6/1971 | Rash et al. | 364/200 |
| 3,596,256 | 7/1971 | Alpert et al. | 364/200 |
| 3,648,245 | 3/1972 | Dodds et al. | 364/200 |
| 3,767,901 | 10/1973 | Black et al. | 364/200 |
| 3,771,131 | 11/1973 | Ling . | |
| 3,935,563 | 1/1976 | Unger . | |
| 4,070,710 | 1/1978 | Sukonick et al. | 364/900 |

FOREIGN PATENT DOCUMENTS

| | | |
|---|---|---|
| 1211189 | 11/1970 | United Kingdom . |
| 1264066 | 2/1972 | United Kingdom . |
| 1278407 | 6/1972 | United Kingdom . |
| 1378224 | 12/1974 | United Kingdom . |
| 1393070 | 5/1975 | United Kingdom . |
| 1474235 | 5/1977 | United Kingdom . |

*Primary Examiner*—James D. Thomas
*Attorney, Agent, or Firm*—Karl F. Ross

[57] ABSTRACT

Data pertaining to the operation of a signal-processing system are written in zones of a central read/write memory which are either permanently or temporarily allocated to respective peripheral units to be monitored and which are each divided into a plurality of phases accommodating multibit words. An interface unit, designed to read out the contents of one or more phases of a memory zone allocated to a chosen peripheral unit and to transfer them to a kinescope or a printer for visualization, includes a buffer store connected to the memory and controlled by a command circuit which responds to several selectors receiving the output signals of an address counter identifying the several memory zones and phases. In the case of temporary allocation, each peripheral unit has a three-word code entered in predetermined phases of the allocated zone which can thus be identified by one of the selectors of the interface unit.

10 Claims, 9 Drawing Figures

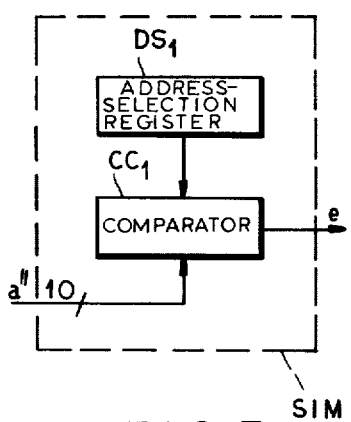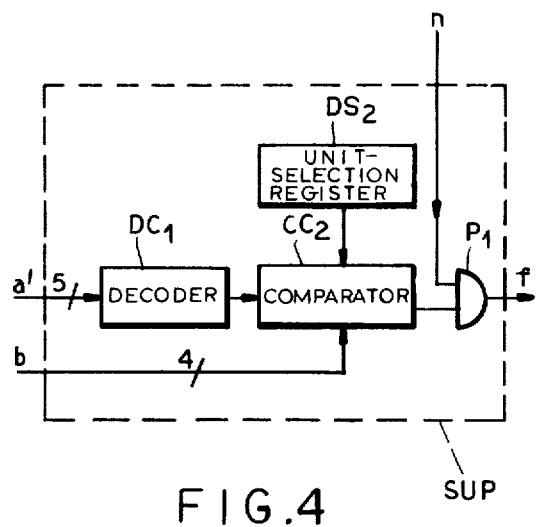
FIG.3      FIG.4
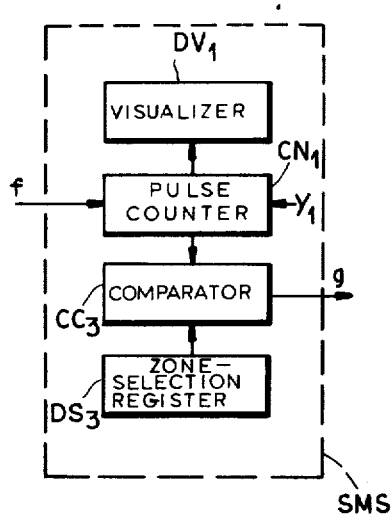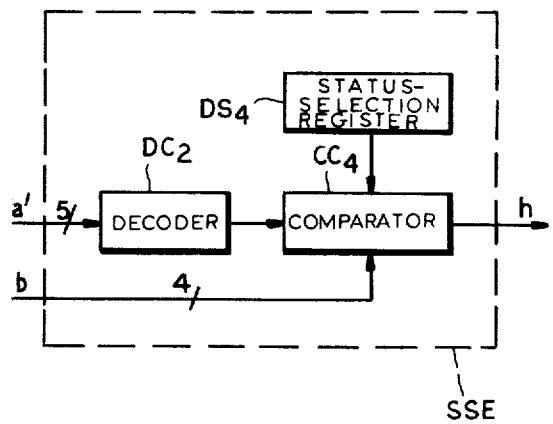
FIG.5      FIG.6

INFORMATION EXTRACTOR FOR THE SELECTIVE VISUALIZATION OF DATA STORED IN A MONITORING MEMORY

FIELD OF THE INVENTION

Our present invention relates to a circuit arrangement for selectively extracting information from a central memory of a signal-processing system, e.g. a telephone exchange, in which the activities of a number of peripheral units (e.g. signal detectors associated with different telephone lines) are to be monitored by the entry of corresponding data in respective memory zones which are permanently or temporarily allocated to these peripheral units.

BACKGROUND OF THE INVENTION

Read/write memories used for this purpose are advantageously of the circulating type described, for example, in commonly owned U.S. Pat. Nos. 3,581,016 and 3,673,340. Such a memory may accommodate a large number of zones each subdivided, in turn, into a plurality of subzones (referred to hereinafter as phases) which are scanned in respective time slots of a recurrent counting cycle. Each phase may hold four bits, for example, for a binary coding of a decimal number. The several phases of a zone can then be used to register various activities of the associated peripheral unit, such as line seizure, selected call digits, start and end of conversation, and possibly the identity of the peripheral unit concerned. The latter information is not needed in a system in which each peripheral unit has a respective memory zone permanently allocated to it, the identity of any peripheral unit being then determined by the location of the corresponding zone in the memory as established by an address counter taking one step for each time slot.

Such processing systems are generally not equipped with self-checking features so that the ascertainment of possible malfunctions is difficult. The technique normally employed for this purpose is to test the messages stored in a memory zone allocated to a particular peripheral unit, such testing being performed with the aid of so-called logic analyzers displaying various characters on a kinescope screen. When these characters depart from a certain pattern, the unit is presumed to be faulty.

Such logic analyzers are rather expensive and their use requires a profound knowledge of the circuitry of the processing system involved. Moreover, they cannot be readily employed in a system in which the peripheral units are randomly associated with memory zones temporarily allocated to them, e.g. on the basis of availability.

OBJECTS OF THE INVENTION

The general object of our present invention, therefore, is to provide an improved circuit arrangement for the selective extraction and visualization of data stored in a monitoring memory forming part of a signal-processing system with a large number of peripheral units to be supervised.

A more particular object is to provide a circuit arrangement of this type usable with both fixed and random association between the peripheral units and the memory zones allocated thereto.

It is also an object of our invention to provide means in such a circuit arrangement for enabling the selection to be based on specific criteria, e.g. the engaged or nonengaged state of a peripheral unit as represented by an entry in a predetermined phase of the allocated zone.

SUMMARY OF THE INVENTION

A circuit arrangement according to our invention comprises a buffer store with input connections to the monitoring memory for receiving data therefrom, the buffer store having a storage capacity accommodating an entire message contained in any one of the several memory zones. We further provide a selection register loadable with a designation of a chosen peripheral unit, identification means including a comparator connected to an address counter synchronized with the memory and to the selection register for emitting a coincidence signal when a memory zone allocated to a designated peripheral unit is being scanned, and transfer means responsive to that coincidence signal for commanding a transmission of the contents of that memory zone by way of the buffer store to an associated display device, e.g. a kinescope or a printer.

In the case of memory zones permanently allocated to respective peripheral units, the unit designation loadable into the selection register will simply be the address of the corresponding memory zone, allowing one set of comparator inputs to be directly connected to certain stage outputs of the address counter. If, on the other hand, the allocation is on a temporary and random basis, our invention provides for the use of a decoder as part of the identification means to detect the address of a predetermined subzone of any memory zone being scanned, i.e. of the phase or phases carrying the designation of the peripheral unit to which the zone happens to be allocated. The decoder works into an enabling input of the comparator which is thus activated during the scanning of that subzone to detect a possible match between one set of data inputs connected to the selection register and another set of data inputs connected directly to the memory for reading the bit combination entered in the scanned subzone.

Experience has shown that, in a random-allocation system, faulty operation may result in assigning more than one memory zone to a given peripheral unit in the course of a counting cycle. In such a case the coincidence signal would appear several times in the output of the comparator during that cycle, thereby indicating a malfunction. We therefore prefer to provide means for counting the number of occurrences of the coincidence signal and for allowing the operator to select a particular zone in the event of such multiple entry. With the aid of suitable logical circuitry, the transmission of data from the memory to the display device in response to a coincidence signal is then made dependent upon detection of an identity between the count of occurrences of that signal and the setting of a numerical selector used for this purpose.

BRIEF DESCRIPTION OF THE DRAWING

The above and other features of our invention will now be described in detail with reference to the accompanying drawing in which:

FIGS. 3, 4, 5 and 6 are more detailed diagrams of several selection devices shown in block form in FIG. 2;

SPECIFIC DESCRIPTION

Figure 1:
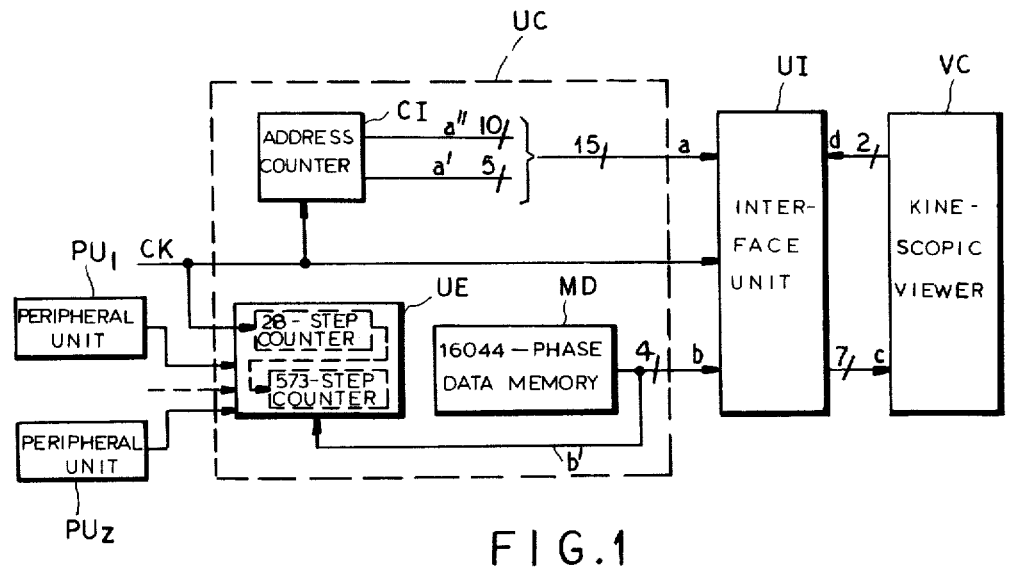
FIG. 1 is a diagrammatic overall view of a processing system to which our invention is applicable.

In FIG. 1 we have shown part of a processing system of the type discussed above, including a centralized component UC and a multiplicity of peripheral units $PU_1 \ldots PU_z$. Component UC comprises a central data memory MD, advantageously of the circulating type, which in this specific example forms 573 zones of 28 phases each so as to accommodate 16,044 4-bit words. Reading and writing in memory MD is controlled by an access unit UE containing a pair of cascaded counters, i.e. a 28-step phase counter and a 573-step zone counter. These counters are driven by clock pulses CK from a nonillustrated time base, in synchronism with an address counter CI consisting of 15 binary stages. A 15-lead output multiple a of counter CI includes a submultiple a', extending from the outputs of the five lowest-ranking stages, and a multiple a" connected to the ten remaining stage outputs. Memory MD had a 4-lead output multiple carrying 4-bit words successively read out from phases scanned during respective time slots established by the clock pulses CK. Each word, therefore, is unequivocally associated with an address simultaneously appearing on output multiple a of counter CI.

A branch b' of multiple b is shown to lead back to access unit UE to indicate the presence of vacant phases in the event that zones are to be randomly allocated to peripheral units $PU_1$-$PU_z$ according to availability.

Figure 2:
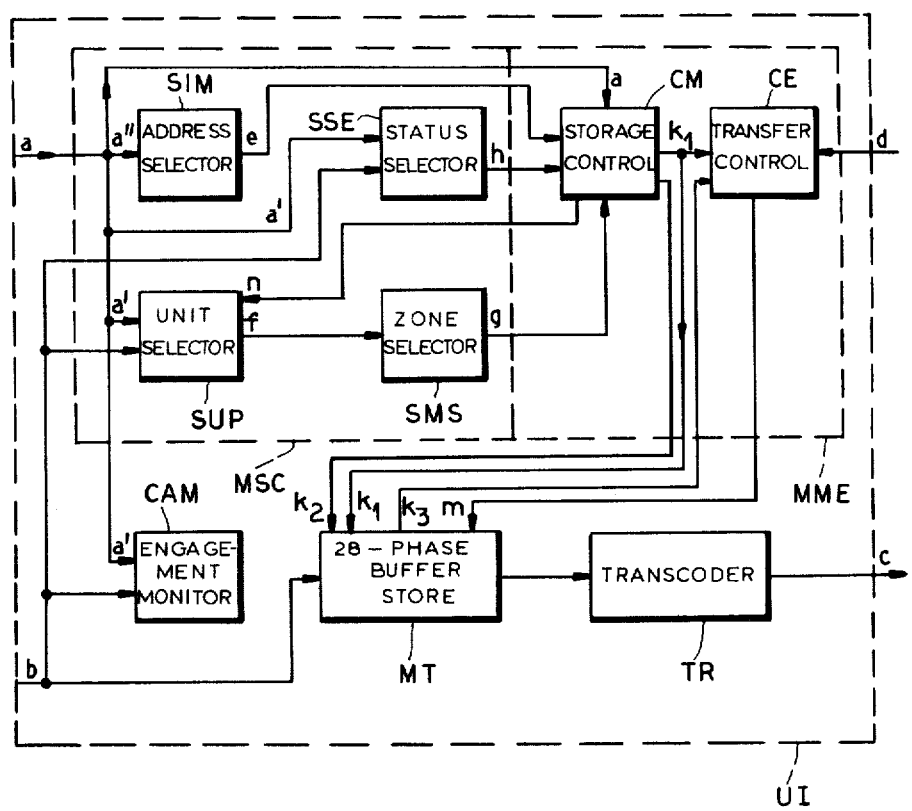
FIG. 2 is a block diagram of an interface unit according to our invention included in the system of FIG. 1.

Multiples a and b extend to an interface unit UI, more fully shown in FIG. 2, which also receives the clock pulses CK. Unit UI determines the transmission of contents of selected memory zones to a kinescopic viewer VC, via a 7-lead multiple c, in response to availability and readout signals sent back by way of a two-lead multiple d.

The number of leads in each multiple has been conventionally indicated in the drawing by a short slanting stroke and a juxtaposed numeral.

The five lowest-ranking stages of counter CI, working into leads a', operate like the 28-step phase counter of access unit UE to restart their count after every 28 clock pulses CK. The ten higher-ranking stages, with output leads a", are the equivalent of the 573-step zone counter in unit UE. Thus, counter CI could be included in unit UE in lieu of the two cascaded counters shown.

In FIG. 2 we have illustrated details of interface unit UI whose constituents include a selection and comparison subunit MSC and a transmission-controlling subunit MME. There is further provided a 28-phase buffer store MT with inputs directly connected to the output multiple b of memory MD (FIG. 1), a transcoder TR inserted between buffer store MT and the outgoing multiple c of unit UI, and an engagement monitor CAM with inputs connected to submultiple a' and multiple b.

Subunit MSC includes an address selector SIM, a unit selector SUP, a status selector SSE and a zone selector SMS. Submultiple a' extends to selectors SUP and SSE whereas submultiple a" feeds selector SIM; selector SSE also has an input connected to multiple b whereas selector SMS receives an output signal f from selector SUP.

Subunit MME includes a storage-control circuit CM and a transfer-control circuit CE. Circuit CM receives output signals e, g and h from selectors SIM, SMS and SSE, respectively, and is also connected to the entire output multiple a of address counter CI (FIG. 1); an output signal $k_1$ is fed by circuit CM to buffer store MT and to circuit CE, the latter also receiving a signal $k_3$ from the buffer store. Other signals $k_2$ and m are transmitted to store MT from circuits CM and CE, respectively. Multiple d, emanating from viewer VC of FIG. 1, terminates at control circuit CE. A lead n extends from circuit CM to block SUP.

Address selector SIM, more fully illustrated in FIG. 3, is used when the zones of memory MD are permanently allocated to respective peripheral units $PU_1$-$PU_z$. To examine the contents of the memory zone allocated to a chosen peripheral unit, the operator loads a selection register $DS_1$ with the address of that zone which appears at one set of inputs of a comparator $CC_1$. This comparator has another set of inputs connected to the 10-lead submultiple a' which carries the selected bit combination whenever the desired zone is being scanned, i.e. for a period of 28 clock pulses. During that period, comparator $CC_1$ emits its coincidence signal e to the storage-control circuit CM of FIGS. 2 and 8.

If the system operates with random allocation of memory zones, three phases of each zone (Nos. 7, 8 and 9) carry an identification code of the peripheral unit temporarily associated therewith. This code will thus consist of three 4-bit words which may represent a 3-digit decimal number assigned to a corresponding telephone line. Selector SUP, shown in FIG. 4, is used in such a case to determine when a zone allocated to a chosen peripheral unit is being scanned. This selector comprises a decoder $DC_1$ whose input is connected to submultiple a' carrying the output signals of the five lowest-ranking stages of counter CI determining the phase of any zone identified by the ten higher-ranking stages. A selection register $DS_2$ is settable by the operator to the identification code of the desired peripheral unit and works into a set of data inputs of a comparator $CC_2$ which has an enabling input connected to decoder $DC_1$ and has another set of data inputs receiving via multiple b the bits stored in a currently scanned phase of memory MD. When decoder $DC_1$ detects the address of phase No. 7 of any memory zone, it activates comparator $CC_1$ which then determines whether or not the bit pattern on multiple b matches that selected in register $DS_2$. If this is the case, and if the same match is found to exist in the following two clock cycles in which phases Nos. 8 and 9 are scanned, comparator $CC_2$ energizes one input of an AND gate $P_1$ whose other input is tied to the output lead n of circuit CM (FIG. 2) and which, upon conduction, emits the coincidence signal f.

Whereas signal e from comparator $CC_1$ of selector SIM is directly sent to control circuit CM, the corresponding output signal f of selector SUP is intercepted by ancillary selector SMS where it steps a pulse counter $CN_1$ as shown in FIG. 5. If a malfunction of access unit UE (FIG. 1) causes allocation of more than one memory zone to the peripheral unit identified by the code entered in register $DS_2$ of FIG. 4, counter $CN_1$ will take a corresponding number of steps as will become apparent to the operator through a visualizer $DV_1$ connected thereto. A zone-selection register $DS_3$, working into a comparator $CC_3$ also connected to pulse counter $CN_1$, acts as a numerical selector and is normally placed in its No. 1 position whereby comparator $CC_3$ produces an output signal g upon the occurrence of the first pulse f in the 16044-pulse counting cycle. If visualizer $DV_1$ shows a number higher than 1, however, the operator may set the register $DS_3$ to select a subsequent memory zone for the display of its contents by the viewer VC of FIG. 1. Signal g, delivered to control circuit CM, terminates upon the resetting of counter $CN_1$ by a pulse $y_1$ transmitted from address counter CI via a nonillustrated branch of multiple a at the end of each counting cycle.

A status-selection register $DS_4$, FIG. 6, forms part of block SSE which has a decoder $DC_2$ and a comparator $CC_4$ connected in parallel with their counterparts $DC_1$ and $CC_2$ of FIG. 4 to leads a' and b, respectively. Register $DS_4$ can be set to indicate a particular operating condition of the chosen peripheral unit, e.g. "off-hook", "ringing" or "talking", entered in a certain phase of the allocated zone, preferably a phase preceding the three phases (Nos. 7, 8, 9) reserved for unit-identification purposes. When decoder $DC_2$ detects that phase, it activates the comparator $CC_4$ which emits a consent signal h in the event of a match, i.e. when the zone being scanned is allocated to a peripheral unit which is in the selected operating condition. Consent signal h, fed to control circuit CM, remains in effect to the end of the zone scan, i.e. until a flip-flop in comparator $CC_4$ set by the detected match is reset by decoder $DC_2$ at the beginning of a new phase count.

The effect of signals g and h upon the operation of subunit MME will be described hereinafter with reference to FIGS. 8 and 9.

Figure 7:
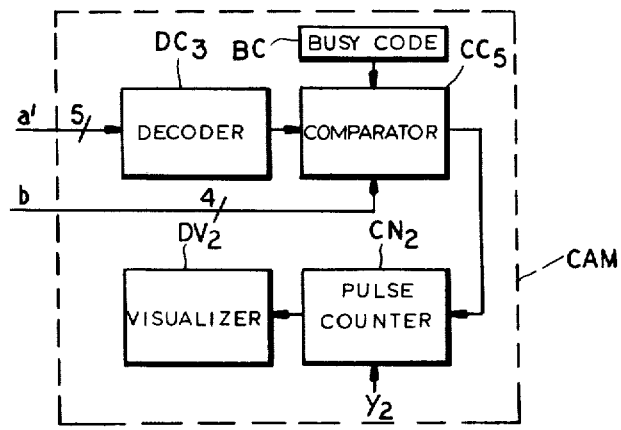
FIG. 7 is a similar diagram of an engagement-counting device also included in the interface unit of FIG. 2.

Engagement monitor CAM, useful for determining the rate of telephone traffic handled by the exchange here considered, is shown in FIG. 7 to comprise a decoder $DC_3$ and a comparator $CC_5$ connected to leads a' and b in a manner analogous to that illustrated for similar elements in FIGS. 4 and 6. Comparator $CC_5$, whose data inputs opposite those tied to multiple b are connected to a store BC carrying a fixed "busy" code, is activated by an enabling signal from decoder $DC_3$ on the scanning of a phase in which a corresponding code is written whenever the associated peripheral unit is engaged. When the two codes match, comparator $CC_5$ steps a counter $CN_2$ working into a visualizer $DV_2$. Counter $CN_2$ may be reset, e.g. manually, by a signal $y_2$.

Block CAM, which does not intervene in the operation of transmission-controlling subunit MME, may be used with fixed or random memory-zone allocation.

Figure 8:
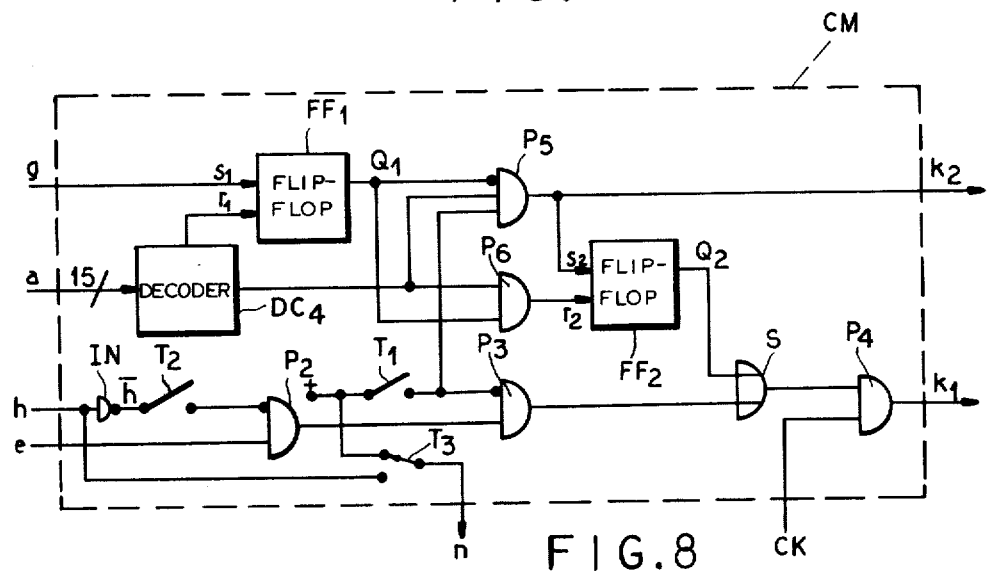
FIG. 8 shows details of a storage-control circuit forming part of that interface unit.

As shown in FIG. 8, storage-control circuit CM comprises a decoder $DC_4$ with inputs connected to all 15 leads of multiple a, a pair of flip-flops $FF_1$, $FF_2$, five AND gates $P_2$-$P_6$ and an OR gate S. A manual switch $T_1$ in series with an inverting input of AND gate $P_3$ is open when selector SIM (FIG. 3) is active, i.e. with permanently allocated memory zones, and can be closed under random-allocation conditions to connect that inverting input as well as a noninverting input of AND gate $P_5$ to constant potential (+). The second, noninverting input of gate $P_3$ is connected to the output of AND gate $P_2$ which has a noninverting input energizable by coincidence signal e from selector SIM and an inverting input normally open-circuited by another manual switch $T_2$. Closure of switch $T_2$ applies to the inverting input of gate $P_2$ the complement $\bar{h}$ of consent signal h, generated by selector SSE of FIG. 6, via an inverter IN. The output of gate $P_3$ extends by way of OR gate S to one input of AND gate $P_4$ whose other input receives the clock pulses CK and whose output, upon conduction, produces the signal $k_1$ as a train of loading pulses for buffer store MT (FIG. 2) in step with these clock pulses.

The output signal g of selector SMS, FIG. 5, arrives at the setting input $s_1$ of flip-flop $FF_1$ whose set output $Q_1$ is connected to one (noninverting) input of AND gate $P_6$ and in parallel therewith to an inverting input of AND gate $P_5$. The remaining, noninverting inputs of gates $P_5$ and $P_6$ are tied to one output of decoder $DC_4$, energized in the last phase (no. 27) of any 28-phase zone scan, a second output of this decoder being energized at the end of a counting cycle and extending to the resetting input $r_1$ of flip-flop $FF_1$. Gate $P_5$, when conducting, produces the signal $k_2$ as a clearing pulse for buffer store MT; this signal is also fed to the setting input $s_2$ of flip-flop $FF_2$ whose resetting input $r_2$ is tied to the output of gate $P_6$ and whose set output $Q_2$ leads to the second input of OR gate S.

Lead n, terminating at AND gate $P_1$ of selector SUP (FIG. 4), is alternatively connectable by a manual switch $T_3$ to constant potential (+) or to the output of selector SSE (FIG. 6) emitting the consent signal h. In the illustrated position of switch $T_3$, the energization of this lead opens the AND gate $P_1$ for passage of any coincidence pulse f.

Figure 9:
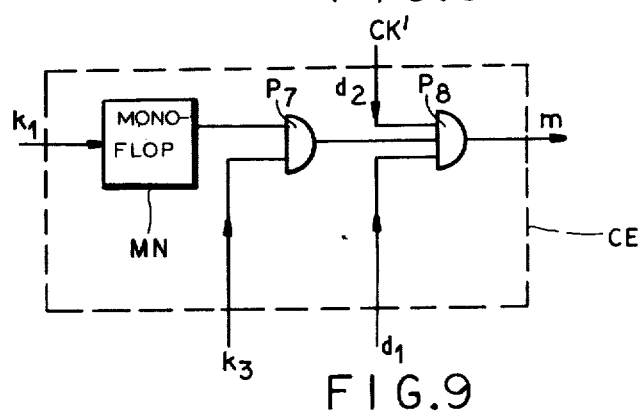
FIG. 9 is a diagram of a transfer-control circuit likewise forming part of the unit of FIG. 2.

Signal $k_1$, besides being fed to a loading input of buffer store MT, also reaches a delay device in the form of a monoflop MN in circuit CE, FIG. 9, whose recovery period is longer than a clock cycle and which is therefore continuously kept off-normal as long as clock pulses CK traverse the AND gate $P_4$ of FIG. 8. When gate $P_4$ is blocked, in a manner to be described below, monoflop MN energizes one input of an AND gate $P_7$ whose other input receives the "data ready" signal $k_3$ from buffer store MT as soon as the latter begins to load the contents of any memory zone. Conduction of gate $P_7$ energizes one of three inputs of a further AND gate $P_8$ whose other two inputs receive, on leads $d_1$, $d_2$ constituting the pair d of FIGS. 1 and 2, an availability signal from viewer VC and a train of clock pulses CK which give rise to the readout signal m transmitted from gate $P_8$ to an unloading input of buffer store MT. The words read out from that store pass the transcoder TR of FIG. 2 which converts them, e.g. according to the well-known ASCY code, into characters capable of being visualized on the screen of kinescope VC.

If the system uses permanent memory-zone allocation, and if switches $T_1$ and $T_2$ are in the open position shown in FIG. 8, the emission of a coincidence signal e by selector SIM will cause gates $P_2$, $P_3$ and S to conduct whereby loading pulses $k_1$ fill the buffer store MT with the contents of the memory zone whose address has been selected by register $DS_1$ (FIG. 3). Upon the disappearance of signal e at the end of the zone scan, store MT is completely occupied and ready to discharge its contents to viewer VC via transcoder TR and multiple c as soon as monoflop MN (FIG. 9) returns to normal, provided that leads $d_1$ and $d_2$ carry signals as described above. Buffer store MT then remains empty for the rest of the counting cycle.

The operator may make the readout dependent on the existence of a certain condition in the chosen peripheral unit by correspondingly setting the status register $DS_4$ of FIG. 6 and closing the switch $T_2$ of FIG. 8. This cuts off the AND gate $P_2$ in the absence of a consent signal h so that the loading pulses $k_1$ will not be generated if the specified condition is not met. In that instance, the contents of a memory zone will be only partly loaded into store MT, beginning with the phase in which signal h appears.

With random allocation, on the other hand, switch $T_1$ must be closed whereby AND gate $P_3$ is permanently blocked and the emission of a signal e by selector SIM will have no effect. With switch $T_3$ in its illustrated position, and with zone-selection register $DS_3$ (FIG. 5) set at a numerical value not exceeding the number of occurrences of coincidence signal f from selector SUP (FIG. 4) in the course of a counting cycle, output signal g will be generated at one point of that cycle and will set the flip-flop $FF_1$. Before that time, however, AND gate $P_5$ conducts at the end of any zone scan (i.e. in phase No. 27) whereby flip-flop $FF_2$ is set and clearing signal $k_2$ is sent to buffer store MT. The setting of this flip-flop unblocks the AND gate $P_4$ by way of OR gate S and give continuous passage to clock pulses CK so that loading pulses $k_1$ are generated and fill up the store MT with the contents of any memory zone scanned, followed by clearing. With the energization of output $Q_1$ of flip-flop $FF_1$, however, gate $P_5$ is blocked, gate $P_6$ conducts in phase No. 27 and flip-flop $FF_2$ is reset to cut off the train of loading pulses. Since there is no clearing pulse $k_2$, the subsequent restoration of monoflop MN (FIG. 9) to normal causes the transfer of the contents of buffer store MT to viewer VC as heretofore described. When the address counter CI (FIG. 1) reaches its full count, decoder $DC_4$ resets the flip-flop $FF_1$, thereby clearing the store MT, reversing the flip-flop $FF_2$ and restarting the emission of loading pulses in the next counting cycle.

In this instance, too, the readout of the stored data to viewer VC can be made dependent on the fulfillment of certain conditions specified by the setting of status-selection register $DS_4$ (FIG. 6). For this purpose the operator need only reverse the switch $T_3$ so that lead n will not be energized except in the presence of signal h to unblock the gate $P_1$ of FIG. 4. Since the event to be detected by decoder $DC_2$ and comparator $CC_4$ of FIG. 6 takes place in an earlier phase than the recognition of the proper memory zone by selector SUP, and since signal h persists for the remainder of the zone scan as noted above, coincidence signal f will come into existence upon successive match detection in blocks SSE and SUP. In this case the entire message written in the memory zone will reach the viewer.

With the circuit arrangement according to our invention it is possible for an operator to simulate, for example, the evolution of a telephone call on a selected line and to observe on viewer VC the sequence of characters in order to determine whether the signal detector associated with that line, representing the chosen peripheral unit, performs properly. Other signal-processing equipment could be similarly monitored.

We claim:

1. A circuit arrangement for selectively extracting information from a read/write memory at a central location of a data-processing system for visualization by an associated display device, said memory being divided into a multiplicity of subzones which are grouped into a plurality of zones at least temporarily allocated to respective peripheral units of the system to be monitored by an operator at said central location and which are periodically scanned in a series of time slots, marked by the stepping of an address counter by timing means generating said time slots, for the reading and writing of data pertaining to the corresponding peripheral units, said circuit arrangement comprising:

a buffer store with input connections to said memory and with a storage capacity for data contained in any one of said zones;

selection means including a register loadable by the operator with a designation of a chosen peripheral unit;

identification means including a comparator connected to said address counter and to said register for emitting a coincidence signal upon the scanning of a zone of said memory allocated to the designated peripheral unit, said identification means further including a decoder connected to said address counter for detecting the address of a predetermined subzone of any zone carrying the designation of a respective peripheral unit to which such zone is temporarily allocated, said comparator being provided with an enabling input connected to said decoder for activation upon detection of the address of said predetermined subzone and being further provided with two sets of data inputs respectively connected to said register and to said memory for receiving from the latter the designation of the respective peripheral unit; and transfer means responsive to said coincidence signal for commanding a transmission of at least part of the contents of the memory zone allocated to the designated peripheral unit via said buffer store to said display device.

2. A circuit arrangement for selectively extracting information from a read/write memory at a central location of a data-processing system for visualization by an associated display device, said memory being divided into a multiplicity of subzones which are grouped into a plurality of zones at least temporarily allocated to respective peripheral units of the system to be monitored by an operator at said central location and which are periodically scanned in a series of time slots, marked by the stepping of an address counter by timing means generating said time slots, for the reading and writing of data pertaining to the corresponding peripheral units, said circuit arrangement comprising:

a buffer store with input connections to said memory and with a storage capacity for data contained in any one of said zones;

selection means including a register loadable by the operator with a designation of a chosen peripheral unit;

identification means including a comparator connected to said address counter and to said register for emitting a coincidence signal upon the scanning of a zone of said memory allocated to the designated peripheral unit, said comparator having two sets of inputs respectively connected to said register and to said counter for successively receiving from the latter the addresses of memory zones permanently allocated to respective peripheral units; and transfer means responsive to said coincidence signal for commanding a transmission of at least part of the contents of the memory zone allocated to the designated peripheral unit via said buffer store to said display device, said transfer means including normally blocked gating means connected to be unblocked by said coincidence signal for giving passage to a train of clock pulses fed to a loading input of said buffer store.

3. A circuit arrangement for selectively extracting information from a read/write memory at a central location of a data-processing system for visualization by an associated display device, said memory being divided into a multiplicity of subzones which are grouped into a plurality of zones at least temporarily allocated to respective peripheral units of the system to be monitored by an operator at said central location and which are periodically scanned in a series of time slots, marked by the stepping of an address counter by timing means generating said time slots, for the reading and writing of data pertaining to the corresponding peripheral units, said circuit arrangement comprising:

a buffer store with input connections to said memory and with a storage capacity for data contained in any one of said zones;

selection means including a register loadable by the operator with a designation of a chosen peripheral unit;

identification means including a comparator connected to said address counter and to said register for emitting a coincidence signal upon the scanning of a zone of said memory allocated to the designated peripheral unit;

transfer means responsive to said coincidence signal for commanding a transmission of at least part of the contents of the memory zone allocated to the designated peripheral unit via said buffer store to said display device;

decoding means connected to said address counter for detecting the address of a certain subzone of any zone carrying a code respresentative of the engaged state of the corresponding peripheral unit;

comparing means having an enabling input connected to said decoding means for activation upon detection of the address of said certain subzone, said comparing means being further provided with two sets of data inputs respectively connected to a busy-code store and said memory for emitting an engagement signal upon detection of an identity between the contents of said certain subzone and of said busy-code store;

an engagement counter connected to the output of said comparing means; and indicator means connected to said engagement counter for visualizing the count thereof.

4. A circuit arrangement as defined in claim 1 or 3 wherein said comparator has two sets of inputs respectively connected to said register and to said counter for successively receiving from the latter the addresses of memory zones permanently allocated to respective peripheral units.

5. A circuit arrangement as defined in claim 1 wherein said selection means further comprises counting means connected to said comparator for stepping by said coincidence signal, a numerical selector, comparison means with inputs connected to said counting means and to said numerical selector, and logical circuitry connected to an output of said comparison means for making the transmission of said contents dependent upon detection of an identity between the position of said counting means and the setting of said numerical selector.

6. A circuit arrangement as defined in claim 1, 5 or 2 wherein said selection means further comprises a status-code selector, decoding means connected to said address counter for detecting the address of a certain subzone of any zone carrying a code representative of the status of the corresponding peripheral unit, comparing means having an enabling input connected to said decoding means for activation upon detection of the address of said certain subzone, said comparing means being further provided with two sets of data inputs respectively connected to said status-code selector and to said memory, and logic means connected to an output of said comparing means for making the transmission of said contents dependend upon detection of an identity between the code in said certain subzone and the setting of said status-code selector.

7. A circuit arrangement as defined in claim 1, 5 or 2, further comprising decoding means connected to said address counter for detecting the address of a certain subzone of any zone carrying a code representative of the engaged state of the corresponding peripheral unit, comparing means having an enabling input connected to said decoding means for activation upon detection of the address of said certain subzone, said comparing means being further provided with two sets of data inputs respectively connected to a busy-code store and said memory for emitting an engagement signal upon detection of an identity between the contents of said certain subzone and of said busy-code store, an engagement counter connected to the output of said comparing means, and indicator means connected to said engagement counter for visualizing the count thereof.

8. A circuit arrangement as defined in claim 1 wherein said transfer means comprises normally unblocked gating means giving passage to a train of clock pulses fed to a loading input of said buffer store, pulse-generating means operative under the control of said address counter to clear said buffer store upon the scanning of the last subzone of any zone in the absence of said coincidence signal, and switchover means responsive to said coincidence signal for blocking said gating means to terminate the loading of said buffer store under the control of said address counter upon the scanning of the last subzone of a zone in which said coincidence signal is generated.

9. A circuit arrangement as defined in claim 2 or 8 wherein said transfer means further comprises delay means responsive to the cessation of passage of said clock pulses through said gating means for initiating a readout of the contents of said buffer store to said display device.

10. A circuit arrangement as defined in claim 9 wherein said delay means comprises a monoflop with a recovery period exceeding the length of a cycle of said clock pulses.

* * * * *